(12) United States Patent
Chin et al.

(10) Patent No.: US 8,613,882 B2
(45) Date of Patent: Dec. 24, 2013

(54) METHOD OF PLANTING A HANDLE AND A BOTTLE PARISON TO A MOLD OF BLOW-MOLDING MODULES FOR MANUFACTURING PLASTIC CONTAINERS

(75) Inventors: Simon Chin, Nantou (TW); Arthur Hsieh, Nantou (TW); Wan-Chi Sun, Nantou (TW)

(73) Assignee: Bottle-Top Development Co., Nantou (TW)

( * ) Notice: Subject to any disclaimer, the term of this patent is extended or adjusted under 35 U.S.C. 154(b) by 153 days.

(21) Appl. No.: 13/012,605

(22) Filed: Jan. 24, 2011

(65) Prior Publication Data

US 2012/0187608 A1 Jul. 26, 2012

(51) Int. Cl.
*B29C 49/20* (2006.01)

(52) U.S. Cl.
USPC .......................................... 264/516; 425/525

(58) Field of Classification Search
USPC ............................ 264/516, 538; 425/534, 540
See application file for complete search history.

(56) References Cited

U.S. PATENT DOCUMENTS

| | | | |
|---|---|---|---|
| 3,932,095 A * | 1/1976 | Moore | 425/397 |
| 4,952,133 A | 8/1990 | Hasegawa et al. | |
| 5,167,970 A * | 12/1992 | Yoshino et al. | 425/525 |
| 5,469,612 A | 11/1995 | Collette et al. | |
| 5,635,226 A * | 6/1997 | Koda et al. | 425/529 |
| 5,988,418 A | 11/1999 | Maeshima | |
| 6,444,158 B1 | 9/2002 | Grob et al. | |
| 7,003,870 B2 * | 2/2006 | Yu | 29/774 |
| 7,207,538 B2 | 4/2007 | Kent-Fawkes | |
| 2004/0130074 A1 * | 7/2004 | Yu | 264/523 |
| 2010/0109207 A1 * | 5/2010 | Rousseau et al. | 264/535 |

\* cited by examiner

*Primary Examiner* — Christina Johnson
*Assistant Examiner* — David Schmerfeld
(74) *Attorney, Agent, or Firm* — Muncy, Geissler, Olds & Lowe, PLLC

(57) ABSTRACT

A method of planting a handle and a bottle parison to a mold of blow-molding modules, including the steps of: first, holding a handle temporarily on a handle positioning device; then, holding a bottle parison temporarily on a bottle parison positioning device while a bottle blowing mold is in a mold-breaking state; moving the handle downward into the bottle blowing mold through the handle positioning device; positioning the handle at a desired position while the bottle blowing mold is switched to the mold-closing state; and moving the bottle parison downward into the bottle blowing mold through the bottle parison positioning device, and clamping the bottle opening of the bottle parison at the same time.

7 Claims, 6 Drawing Sheets

METHOD OF PLANTING A HANDLE AND A BOTTLE PARISON TO A MOLD OF BLOW-MOLDING MODULES FOR MANUFACTURING PLASTIC CONTAINERS

FIELD OF THE INVENTION

The present invention relates to a blow-molding module for manufacturing plastic containers and particularly to a method of planting a handle and a bottle parison to a bottle blowing mold during fabrication of plastic containers with handles.

BACKGROUND OF THE INVENTION

Conventionally, plastic bottles with handles, such as U.S. Pat. Nos. 5,988,418, 5,469,612 and 7,207,538, are usually fabricated by a bottle blowing machine. The bottle blowing machine produces a bottle body initially and then plants a handle onto the bottle body, such that an extra planting process and a higher production cost are required.

To overcome the aforesaid drawback, a technique, such as U.S. Pat. No. 6,444,158, is applied to directly plant a bottle parison and a handle into a bottle blowing mold to form a bottle body with attached handle at the same time during bottle blowing process in a bottle blowing machine. However, the planting path is vertical to the axis of the bottle parison and the handle and bottle parison are planted at the same time on the front side of the bottle blowing mold, so production yield is lower due to constraints of the required mechanism and cannot fully meet the demands.

Another U.S. Pat. No. 4,952,133 also discloses a technique to plant a bottle parison and a handle at the same time. It needs to position the handle and bottle parison at fixed locations relative to each other before the bottle parison is heated, after heated they are sent into a mold. Its production yield also is lower and cannot meet the demands.

SUMMARY OF THE INVENTION

The primary object of the present invention is to provide a method applied for blow-molding modules for manufacturing plastic containers during bottle blowing process and planting a handle and a bottle parison to the blow-molding module.

To achieve the foregoing object, the method of the present invention aims to plant a handle and bottle parison respectively in a blow-molding module for manufacturing plastic containers. The blow-molding module includes a rotary bracket, a bottle blowing mold, a bottle parison positioning device and a handle positioning device. The bottle blowing mold is located on the rotary bracket and has a mold-breaking state and a mold-closing state. The handle positioning device has a handle holding portion and is slidable up and down above the bottle blowing mold. The bottle parison positioning device has a bottle parison holding portion and is slidable up and down above the bottle blowing mold.

The method of the invention includes the steps of: first, placing the handle temporarily on the handle positioning device; then, placing the bottle parison temporarily on the bottle parison positioning device while the bottle blowing mold is in the mold-breaking state; planting the handle downward into the bottle blowing mold through the handle positioning device; making the bottle blowing mold from the mold-breaking state to the mold-closing state to hold the handle at a desired location; and planting the bottle parison downward into the bottle blowing mold through the bottle parison positioning device, and pressing tightly a bottle opening of the bottle parison at the same time.

Thus, in the method of the present invention, the handle and the bottle parison are respectively moved downward into the bottle blowing mold, so that during bottle blowing process to blow the bottle parison to form a bottle body, the handle also is planted at the same time on the bottle body. Therefore, the production yield can be increased and meet the demands The foregoing, as well as additional objects, features and advantages of the invention will be more readily apparent from the following embodiment and detailed description, which proceed with reference to the accompanying drawings. The embodiment serves merely for illustrative purpose and is not the limitation of the invention.

DETAILED DESCRIPTION OF THE PREFERRED EMBODIMENT

Figure 1:
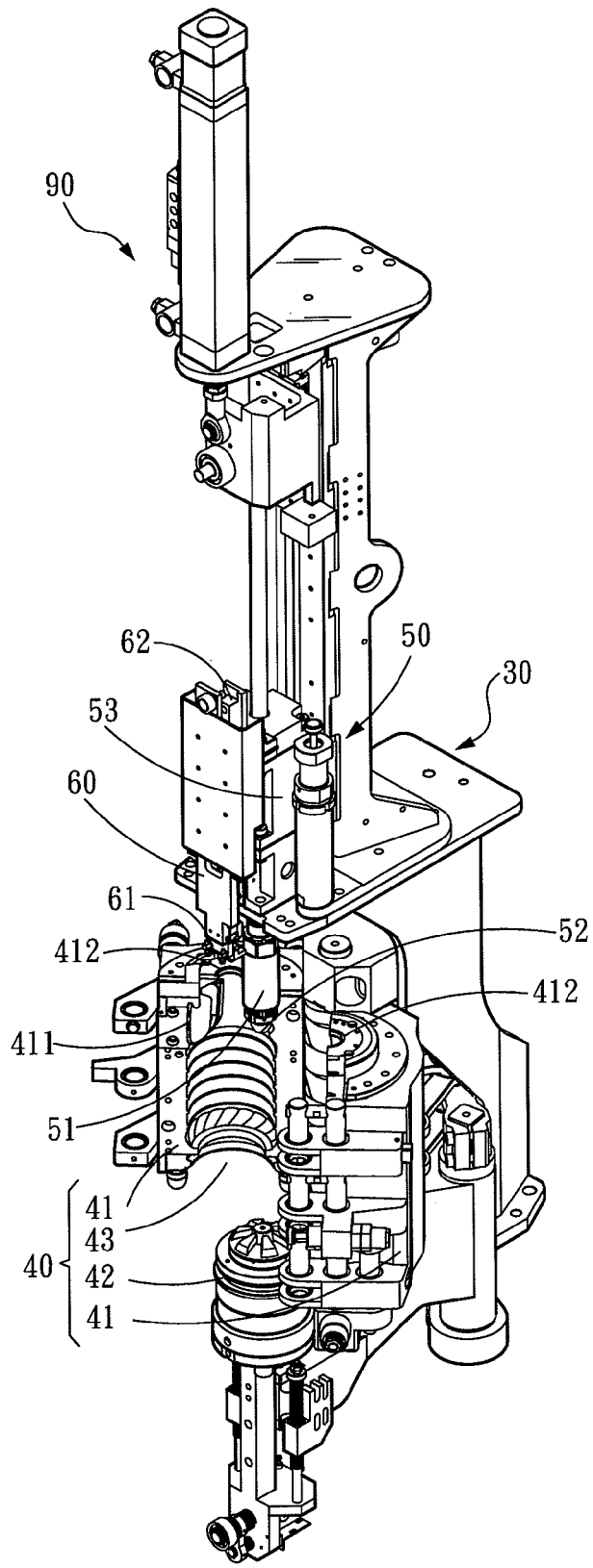
FIG. 1 is a perspective view schematically showing a blow-molding module enabled to plant a handle according to the present invention.
Figure 2A:
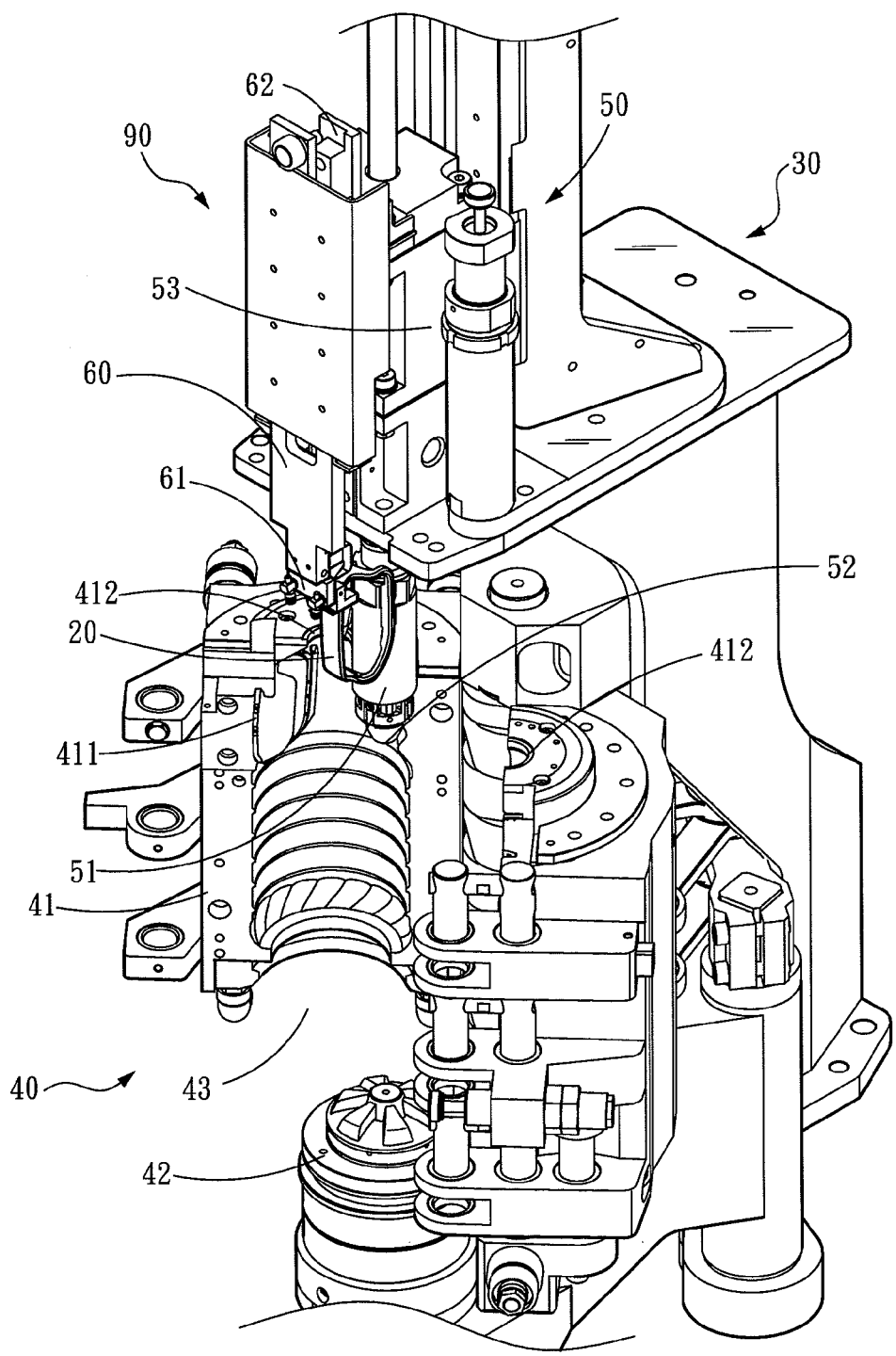
FIGS. 2A to 2E are perspective views schematically showing the continuous operation of the blow-molding module enabled to plant a handle in bottle blowing process.
Figure 2B:
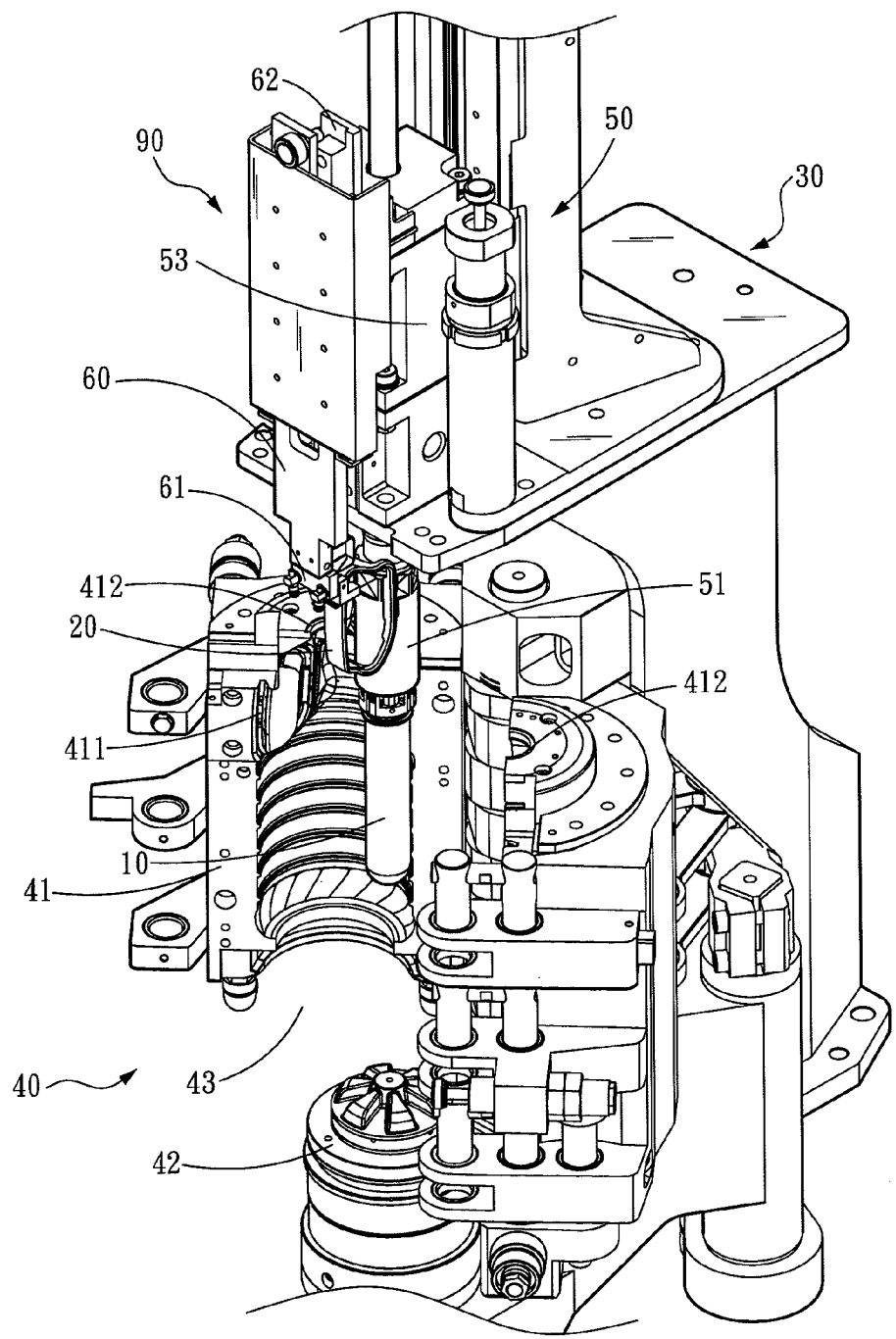
Figure 2C:
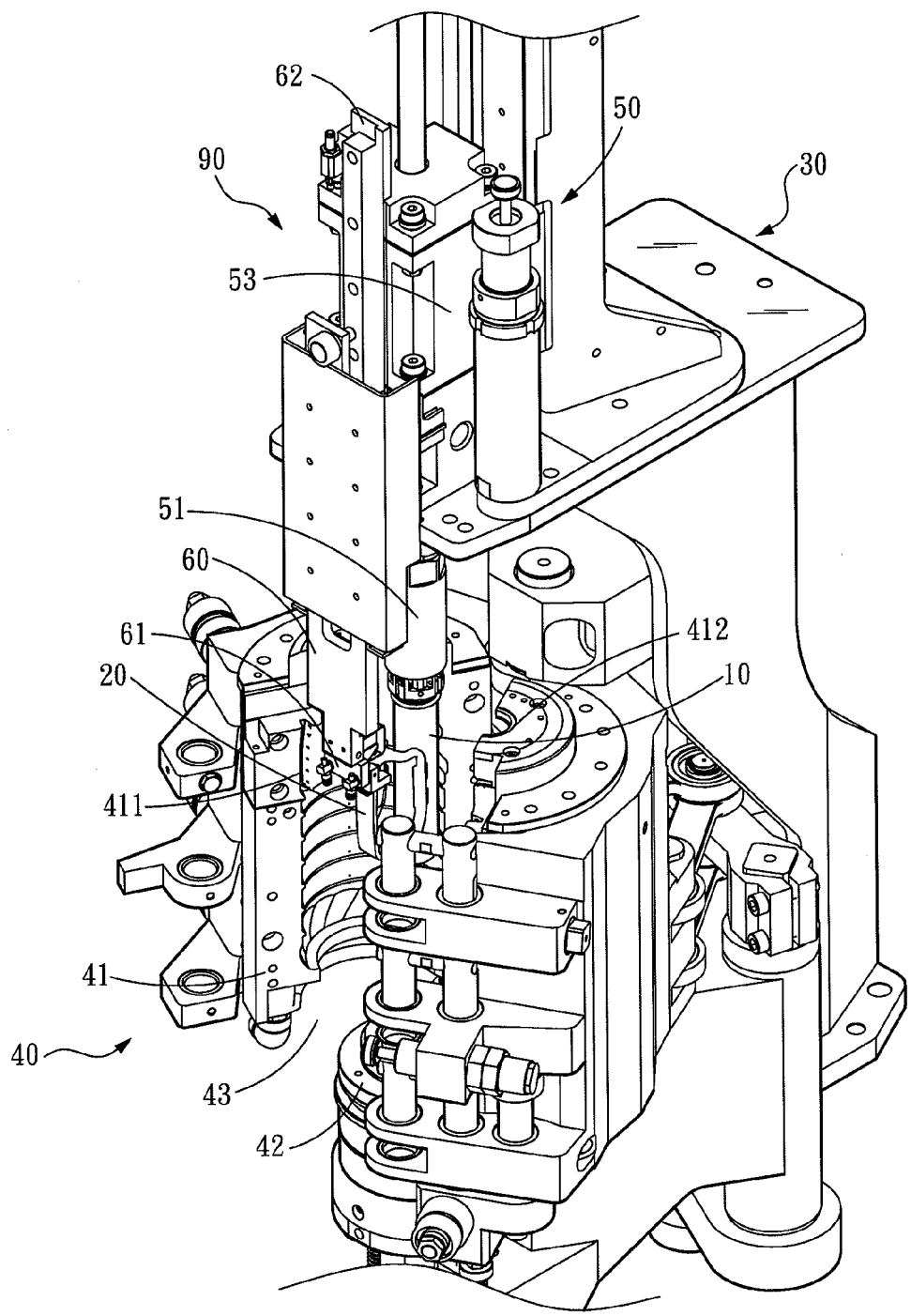
Figure 2D:
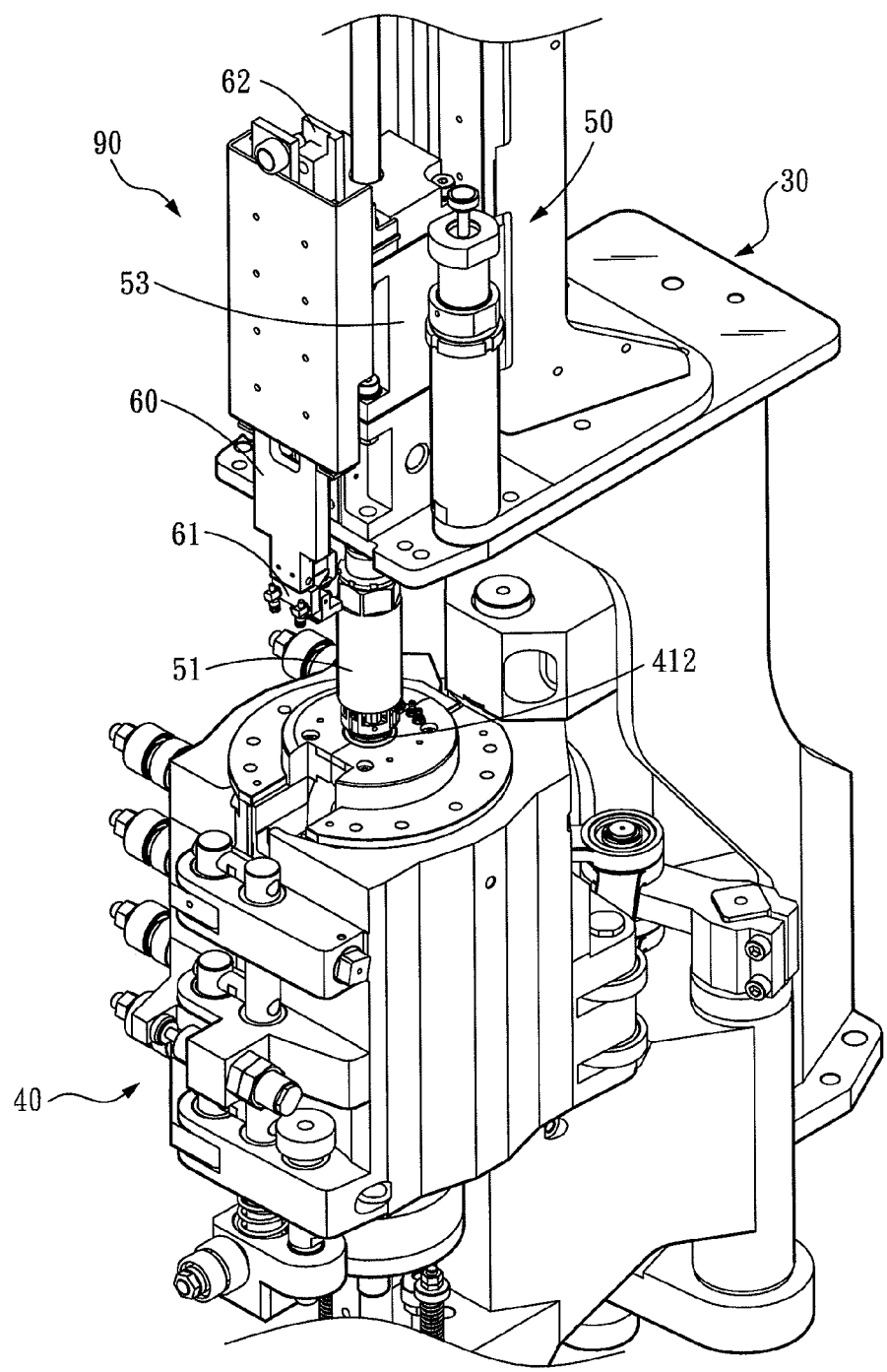
Figure 2E:
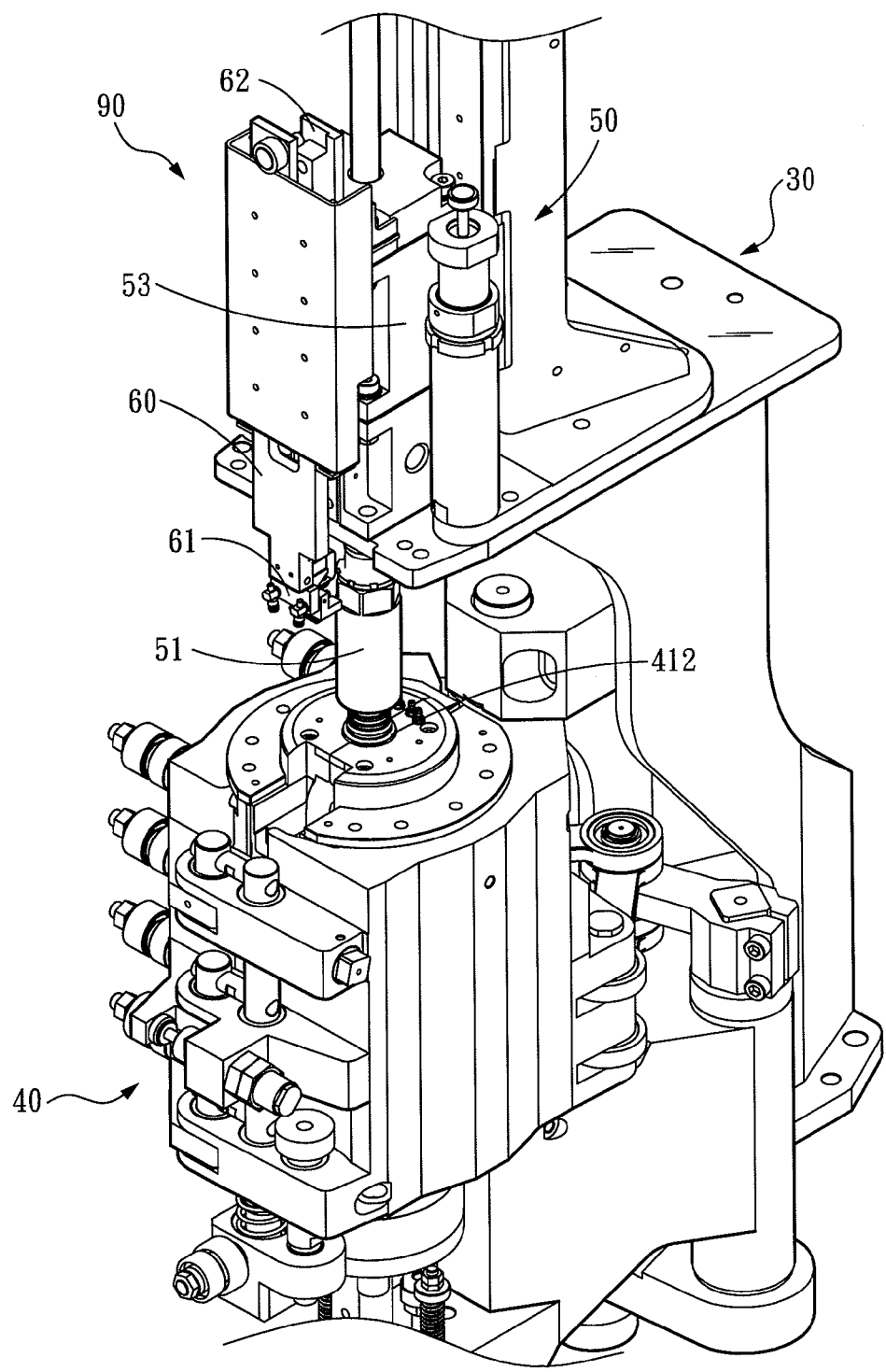

Referring to FIGS. 1 and 2A through 2E, the present invention provides a method for planting a handle 20 and a bottle parison 10 through a blow-molding module 90 during a bottle blowing process. The blow-molding module 90 includes a rotary bracket 30, a bottle blowing mold 40, a bottle parison positioning device 50 and a handle positioning device 60.

The bottle blowing mold 40 is located on the rotary bracket 30 and has a mold-breaking state and a mold-closing state. The bottle blowing mold 40 further includes a pair of left and right molds 41 and a base mold 42 that can be coupled together in the mold-closing state to form a bottle blowing chamber 43. The left and right molds 41 include a pair of handle holding troughs 411 to hold the handle 20 in the bottle blowing mold 40, and also a pair of bottle parison holding docks 412 to hold the bottle parison 10 in the bottle blowing mold 40 and clamp tightly a bottle opening of the bottle parison 10 to facilitate bottle blowing process.

The bottle parison positioning device 50 is slidable up and down and located above the bottle blowing mold 40. The bottle parison position device 50 includes a bottle parison holding portion 51, a bottle mouth clamping portion 52 and a press cylinder 53 which has a first displacement and a second displacement. When the bottle blowing mold 40 is in the mold-breaking state the bottle parison positioning device 50 clamps and holds temporarily the bottle parison 10 on the bottle parison holding portions 51 by the press cylinder 53 in the first displacement. When the bottle blowing mold 40 is in the mold-closing state the press cylinder 53 moves the bottle parison 10 downward from a upper side along a path parallel with the axis of the bottle parison 10 in the second displacement to fix the bottle parison 10 in the bottle blowing mold 40, and the bottle mouth clamping portion 52 tightly clamps the bottle parison 10 on the bottle parison holding docks 412.

The handle positioning device 60 is slidable up and down and located above the bottle blowing mold 40. The handle positioning device 60 includes a handle holding portion 61 and an in-mold slide track 62. Before the bottle blowing mold 40 is in the mold-breaking state the handle positioning device 60 clamps the handle 20 on the handle holding portion 61 and holds temporarily the handle 20 above the bottle blowing mold 40. When the bottle blowing mold 40 is in the mold-breaking state the handle 20 is moved downwards from the upper side through the in-mold slide track 62 into the bottle blowing mold 40 along a path parallel with the axis of the bottle parison 10. When the bottle blowing mold 40 is in the mold-closing state, the handle holding troughs 411 hold the handle 20 at a position corresponding to the bottle blowing mold 40.

By means of the structure set forth above, the handle 20 can be planted through the blow-molding module 90 during bottle blowing process via steps shown in FIGS. 2A through 2E. First, the handle holding portion 61 holds the handle 20 temporarily above the bottle blowing mold 40 (referring to FIG. 2A). Then, when the bottle blowing mold 40 is in mold-breaking state, the press cylinder 53 in the first displacement holds temporarily the bottle parison 10 on the bottle parison holding portion 51 (referring to FIG. 2B). When the bottle blowing mold 40 is in the mold-breaking state, the handle 20 is moved downwards from the upper side into the bottle blowing mold 40 along a path parallel with the axis of the bottle parison 10 through the in-mold slide track 62 (referring to FIG. 2C). Next, when the bottle blowing mold 40 is in the mold-closing state, the handle holding troughs 411 fix the handle 20 at a position corresponding to the bottle blowing mold 40 (referring to FIG. 2D). At last, the press cylinder 53 in the second displacement moves the bottle parison 10 downward from an upper side into the bottle blowing mold 40 along a path parallel with the axis of the bottle parison 10, and the bottle mouth clamping portion 52 tightly presses the bottle parison 10 on the bottle parison holding docks 412 (referring to FIG. 2E). Thus during the bottle blowing process, the bottle blank 10 and handle 20 are held in the bottle blowing mold 40, and the handle 20 also can be planted at the same time on the bottle body formed by the bottle parison 10.

In short, through the present invention, during the bottle blowing process the handle 20 and bottle parison 10 are moved respectively downward from the upper side into the bottle blowing mold 40 along a path parallel with the axis of the bottle parison 10 so as to allow the handle 20 to be planted onto the bottle body at the same time to meet the demands.

What is claimed is:

1. A method of planting a handle and a bottle parison to a mold for blow-molding modules for manufacturing plastic containers, the blow-molding module including a rotary bracket, a bottle parison positioning device, a handle positioning device and a bottle blowing mold having a mold-breaking state and a mold-closing state, the method consisting of the steps of:

holding the handle temporarily through the handle positioning device above the bottle blowing mold before the mold-breaking state;

holding the bottle parison temporarily through the bottle parison positioning device during the mold-breaking state;

moving the handle downward directly into a section of the bottle blowing mold corresponding with a bottle blowing chamber through the handle positioning device along a path parallel with the axis of the bottle parison;

holding the handle in a fixed manner in the bottle blowing chamber which is formed in the bottle blowing mold during the mold-closing state; and moving the bottle parison downward into the bottle blowing mold through the bottle parison positioning device along a path parallel with the axis of the bottle parison and clamping tightly a bottle opening of the bottle parison.

2. The method of claim 1, wherein the bottle blowing mold is located on the rotary bracket, the bottle parison positioning device including a bottle parison holding portion, a bottle mouth clamping portion and a press cylinder, the bottle parison holding portion holding the bottle parison and being slidable up and down above the bottle blowing mold; the handle positioning device including an in-mold slide track and a handle holding portion to hold the handle and be slidable up and down above the bottle blowing mold.

3. The method of claim 2, wherein the bottle parison positioning device is located above the bottle blowing mold which holds the bottle parison temporarily by the press cylinder on the bottle parison holding portion in the mold-breaking state.

4. The method of claim 3, wherein the press cylinder moves the bottle parison downward along a path parallel with the axis of the bottle parison to be positioned on the bottle blowing mold in the mold-closing state, the bottle opening of the bottle parison being pressed by the bottle mouth clamping portion.

5. The method of claim 2, wherein the handle positioning device is located above the bottle blowing mold to hold temporarily the handle through the handle holding portion above the bottle blowing mold before the mold-breaking state.

6. The method of claim 5, wherein the held handle is moved downward through the in-mold track along a path parallel with the axis of the bottle parison and planted into the bottle blowing mold in the mold-breaking state.

7. The method of claim 6, wherein the handle planted in the bottle blowing mold is fixedly held in the bottle blowing mold through handle holding troughs to be positioned in the desired bottle blowing chamber in the mold-closing state.

* * * * *